United States Patent [19]
Parsons et al.

[11] Patent Number: 6,067,210
[45] Date of Patent: May 23, 2000

[54] MOVABLE CARRIAGE ASSEMBLY SUPPORTING GLAD/WRITE HEADS FOR A DISK DRIVE

[75] Inventors: James H. Parsons, Berthoud; Glade N. Bagnell, Longmont, both of Colo.

[73] Assignee: Caleb Technology Corporation, Boulder, Colo.

[21] Appl. No.: 08/965,233

[22] Filed: Nov. 6, 1997

[51] Int. Cl.[7] .................................................. G11B 21/08
[52] U.S. Cl. .......................................... 360/106; 369/219
[58] Field of Search ................................... 360/105, 106, 360/215, 219

[56] References Cited

U.S. PATENT DOCUMENTS 4,568,992  2/1986  Kaczeus et al. ...................... 360/105

FOREIGN PATENT DOCUMENTS

3-288378  12/1991  Japan .

Primary Examiner—William R. Korzuch
Attorney, Agent, or Firm—Emery L. Tracy; Stephen C. Shear

[57] ABSTRACT

A carriage assembly for a computer disk drive is provided. The carriage assembly comprises a movable carriage for supporting read/write heads for movement relative to one or more magnetic disks, the movable carriage having one or more slots. A guiding structure supports the movable carriage for guiding the movement of the movable carriage, the guiding structure having one or more slots. A plurality of spherical balls is provided with each spherical ball located between a slot of the movable carriage and a slot of the guiding structure.

14 Claims, 8 Drawing Sheets

MOVABLE CARRIAGE ASSEMBLY SUPPORTING GLAD/WRITE HEADS FOR A DISK DRIVE

BACKGROUND OF THE INVENTION

1. Field of the Invention

The invention relates generally a disk drive carriage assembly for computer disk drives and, more particularly, it relates to a disk drive carriage assembly for computer disk drives which has a carriage movable along a guiding structure with a plurality of spherical balls between the carriage and the guiding structure.

2. Description of the Prior Art

A typical computer disk drive includes a spindle motor for rotating one or more magnetic disks on which data is stored, one or more read/write heads for reading data from and writing data on the disk(s). The disk drive further includes an actuator assembly for positioning the read/write heads relative to the disk(s) and a housing in which the various components are mounted.

Concerning the actuator assembly, a typical actuator assembly includes an actuator motor and a carriage assembly, the carriage assembly having a movable carriage on which the read/write heads are mounted (typically by support arms or flexures) and a guiding structure on which the movable carriage is supported for guiding the movement of the carriage. The guiding structure is fixed to the disk drive housing. In response to electronic signals from the host computer, the actuator motor imparts a motive force to the movable carriage portion of the actuator assembly, thereby moving the movable carriage relative to the guiding structure on which it is supported and positioning the read/write heads over the appropriate tracks on the disk(s).

Various arrangements are used for mounting the movable carriage on the guiding structure. One typical arrangement, for example, is for the actuator assembly to have a number of radial bearing assemblies, the inner races of the bearing assemblies being fixed on spindles attached to the carriage and the outer races of the bearing assemblies being positioned on corresponding guide rails fixed relative to the disk drive housing, so that the bearing assemblies roll along the guide rails. Another way is for the carriage to have one or more sliding bushings attached to it, the bushings in turn being mounted on guide rails fixed with respect to the housing, so that the sliding bushings slide along the guide rails.

Accordingly, there exists a need for an improved disk drive carriage assembly that provides a cost effective arrangement and accurate and stable read/write head positioning.

SUMMARY

The present invention is a carriage assembly for a computer disk drive. The carriage assembly comprises a movable carriage for supporting read/write heads for movement relative to one or more magnetic disks with the movable carriage having one or more slots. A guiding structure supports the movable carriage for guiding the movement of the movable carriage with the guiding structure having one or more slots. A plurality of spherical balls are provide with each spherical ball located between a slot of the movable carriage and a slot of the guiding structure.

In an embodiment of the present invention, the carriage assembly further comprises at least one rail within at least one of the slots of the movable carriage. Preferably, at least one rail is biased by a preload spring.

In another embodiment of the present invention, the carriage assembly further comprises at least one rail within at least one of the slots of the guiding structure. Preferably, at least one rail is biased by a preload spring.

The present invention also includes a carriage assembly for a computer disk drive. The carriage assembly comprises a movable carriage for supporting read/write heads for movement relative to one or more magnetic disks. A guiding structure supports the movable carriage for guiding the movement of the movable carriage. Furthermore, a plurality of spherical balls are provided wherein each of the movable carriage and guiding structure has a bearing retention structure, and each spherical ball is located between the bearing retention structure of the movable carriage and the bearing retention structure of the guiding structure.

In an embodiment of the present invention, the bearing retention structure of the movable carriage comprises one or more slots. Preferably, the carriage assembly further comprises at least one rail within at least one of the slots of the bearing retention structure of the movable carriage. Furthermore, preferably, at least one rail is biased by a preload spring.

In another embodiment of the present invention, the bearing retention structure of the movable carriage comprises one or more rails. Preferably, the bearing retention structure of the guiding structure comprises one or more slots. Furthermore, preferably, at least one rail within at least one of the slots of the bearing retention structure of the guiding structure. Also, preferably, at least one rail is biased by a preload spring.

In yet another embodiment of the present invention, the bearing retention structure of the guiding structure comprises one or more rails.

DETAILED DESCRIPTION OF THE PREFERRED EMBODIMENTS

Figure 1:
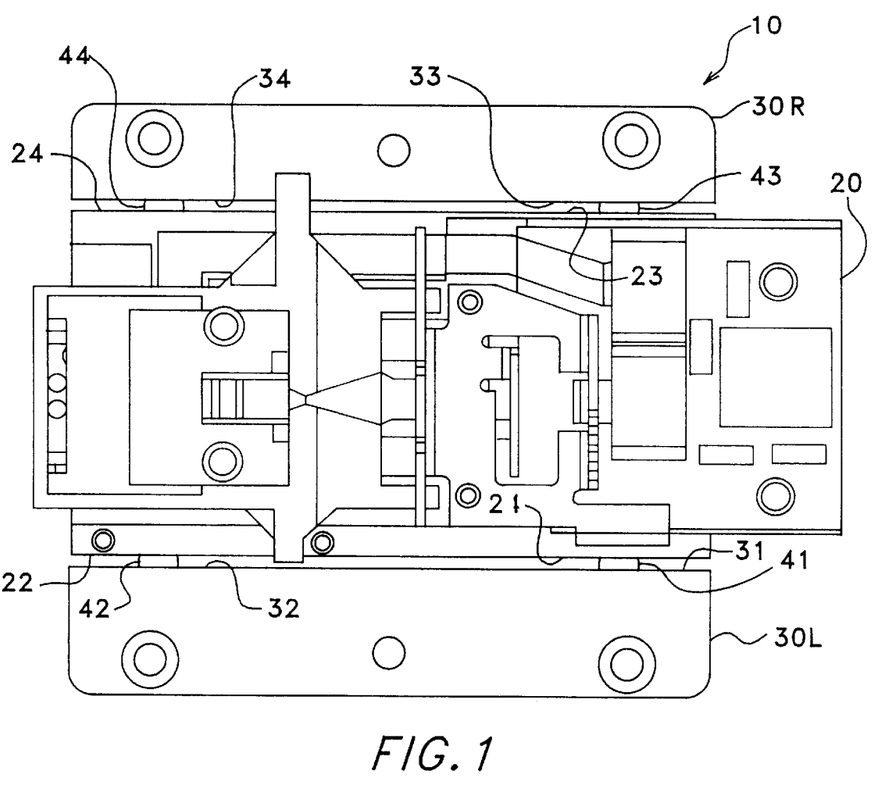
FIG. 1 is a top plan view of an embodiment of a disk drive carriage assembly constructed in accordance with the present invention.
Figure 2:
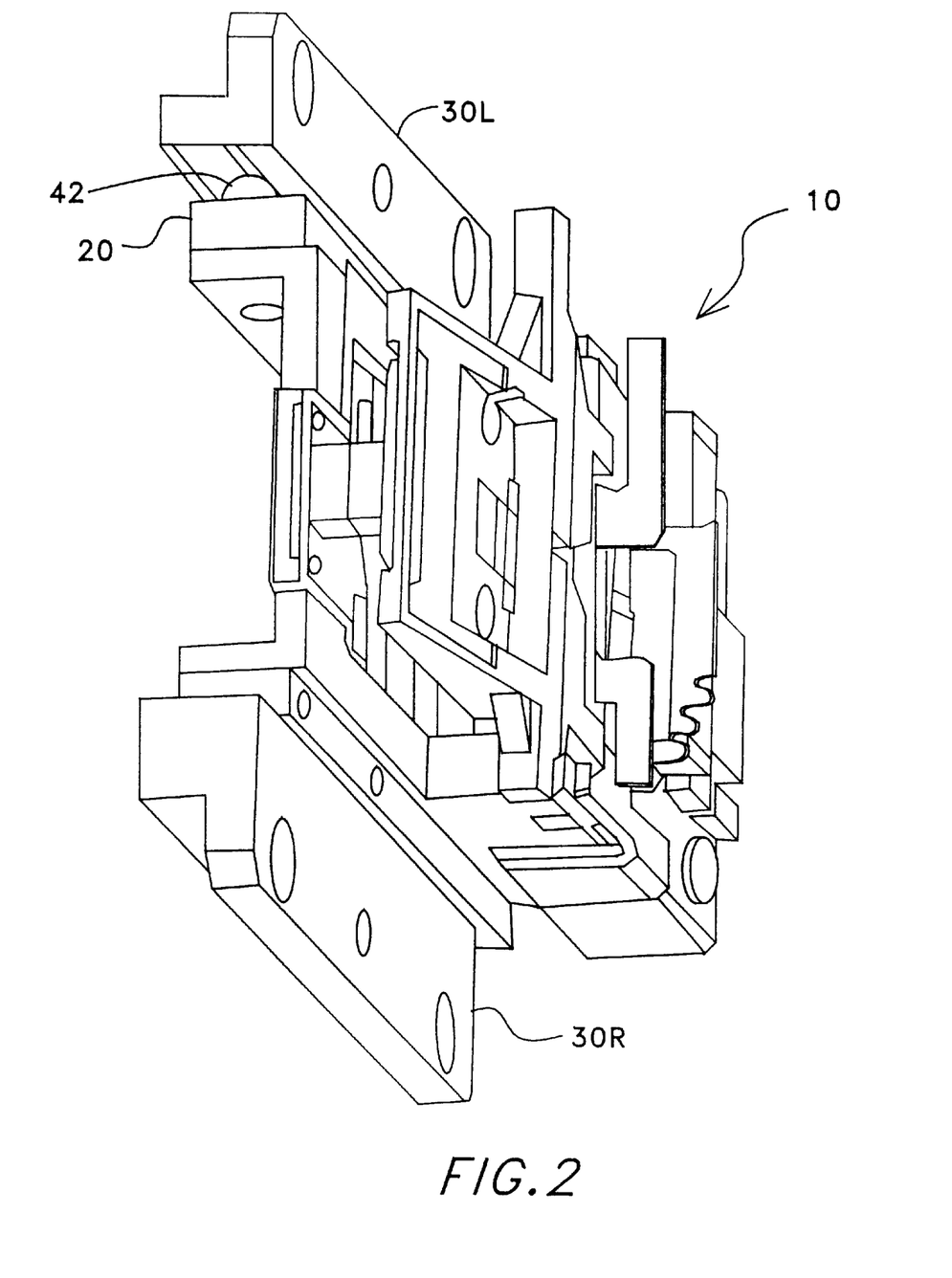
FIG. 2 is a top perspective view of the disk drive carriage assembly as illustrated in FIG. 1 constructed in accordance with the present invention.
Figure 3:
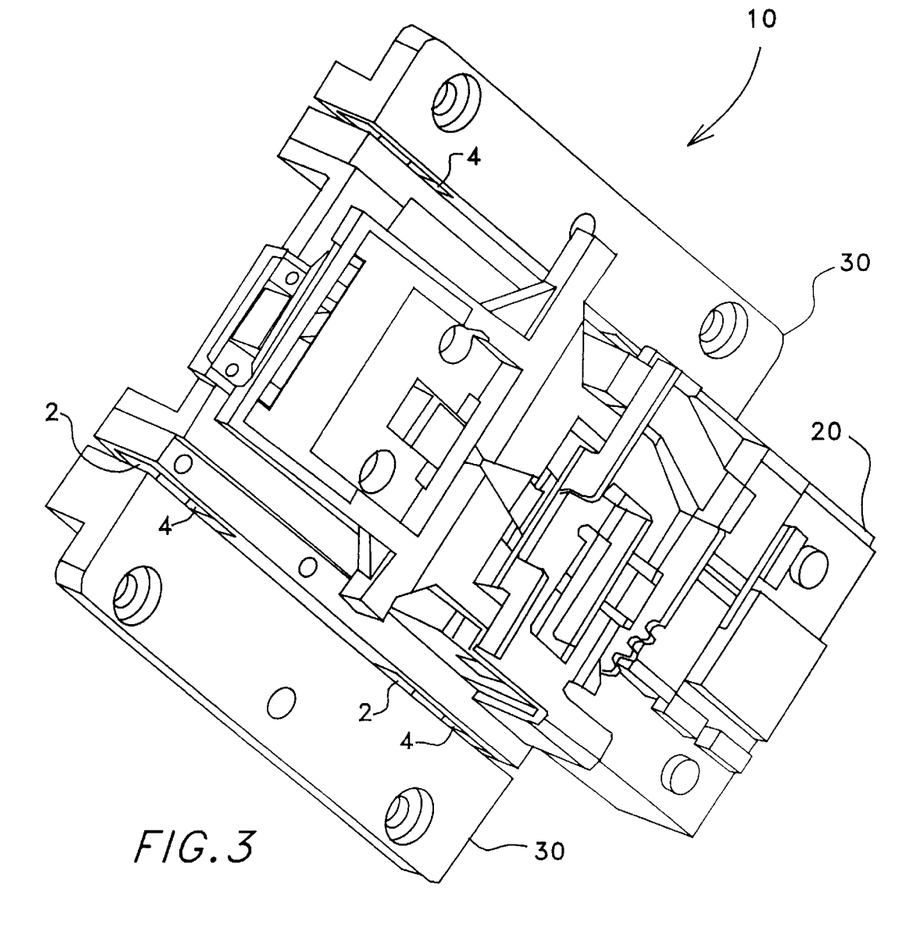
FIG. 3 is another top perspective view of the disk drive carriage assembly as illustrated in FIG. 1 constructed in accordance with the present invention.

As illustrated in FIGS. 1, 2, and 3, the present invention is a carriage assembly, indicated generally at 10, having a movable carriage 20 on which read/write heads are mounted [by support arms or flexures], and a guiding structure 30 for guiding the movement of the carriage 20. The guiding structure 30 has a left guiding structure portion 30L and a right guiding structure portion 30R. Both the left guiding structure portion 30L and the right guiding structure portion 30R are mounted to a disk drive housing (not shown).

Figures 7, 8, 9, 10:
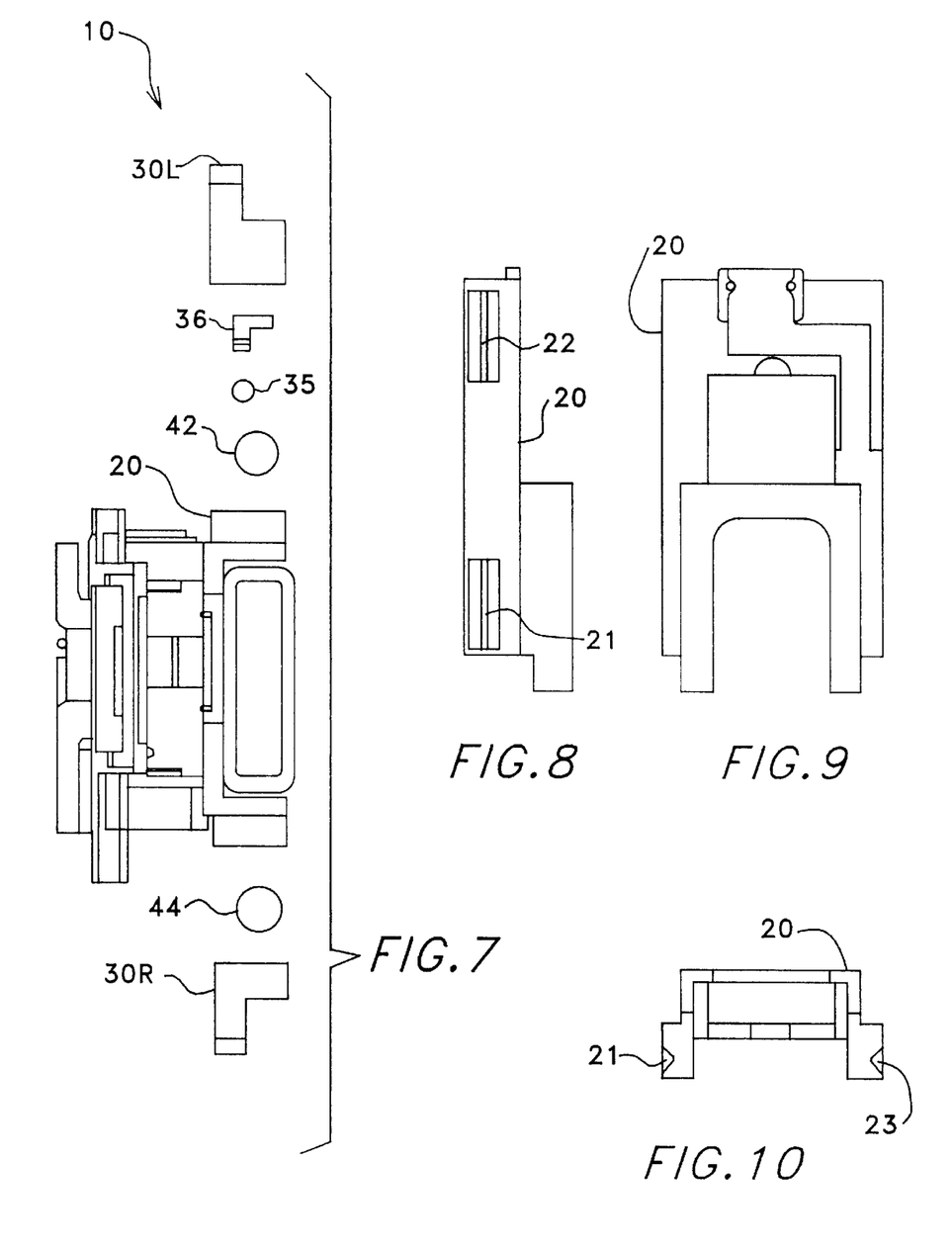
FIG. 7 is a front exploded view of the disk drive carriage assembly as illustrated in FIG. 1 constructed in accordance with the present invention.
FIG. 8 is a side elevational view of a movable carriage of a disk drive carriage assembly constructed in accordance with the present invention.
FIG. 9 is a top plan view of the movable carriage of the disk drive carriage assembly as illustrated in FIG. 8 constructed in accordance with the present invention.
FIG. 10 is a rear elevational view of the movable carriage of the disk drive carriage assembly as illustrated in FIG. 8 constructed in accordance with the present invention.

As illustrated in the exploded views of FIG. 4–7, as well as in FIGS. 8 and 10, the movable carriage 20 has an integrally formed bearing retention structure in the form of slots 21, 22, 23 and 24. The guiding structure 30 has a bearing retention structure in the form of integrally formed slots 31, 32, 33, and 34, a rail 35, and a preload spring 36. The rail 35 is positioned in the left guiding structure portion 30L in a rail accommodation slot 37 which spans the slots 31 and 32.

Positioned within each pair of opposing slots 21 and 31, 22 and 32, 23 and 33, and 24 and 34, is individual spherical balls or ball bearing 41, 42, 43, and 44. That is, the ball bearing 41 is positioned within the slots 21 and 31, the ball bearing 42 is positioned within the slots 22 and 32, the ball bearing 43 is positioned within the slots 23 and 33, and the ball bearing 44 is positioned within the slots 24 and 34.

Figure 4:
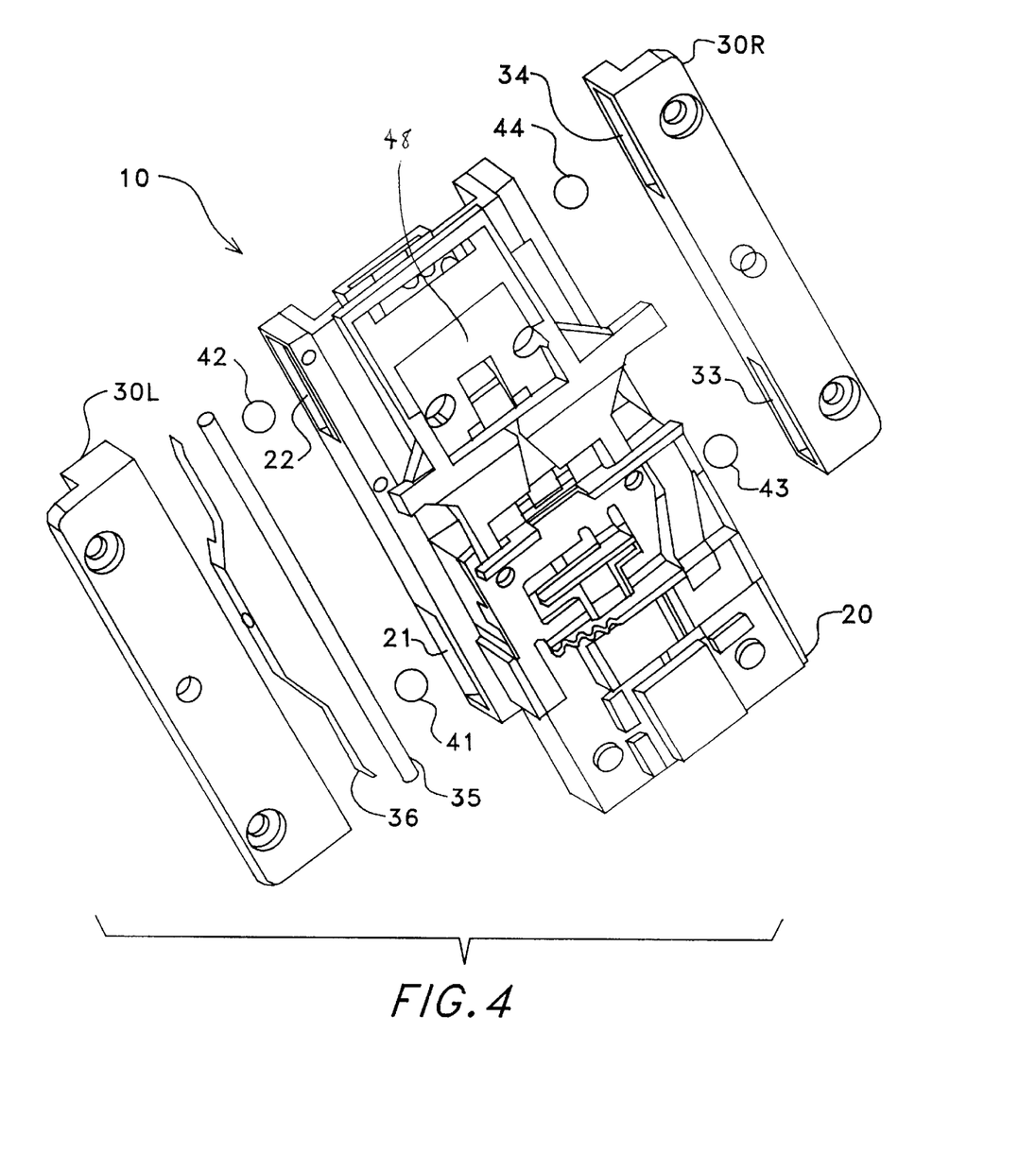
FIG. 4 is a top perspective exploded view of the disk drive carriage assembly as illustrated in FIG. 1 constructed in accordance with the present invention.
Figure 5:
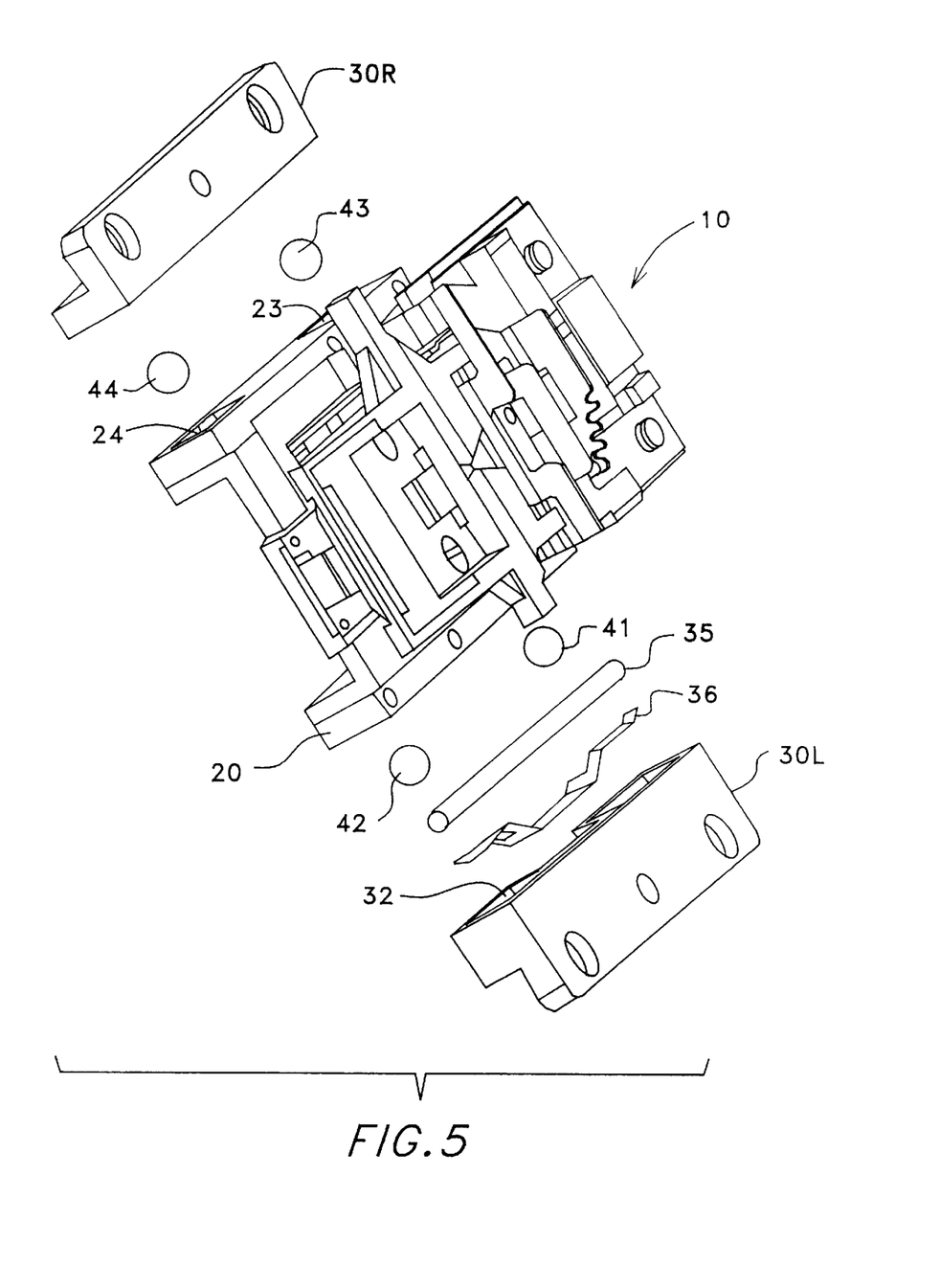
FIG. 5 is another top perspective exploded view of the disk drive carriage assembly as illustrated in FIG. 1 constructed in accordance with the present invention.
Figure 6:
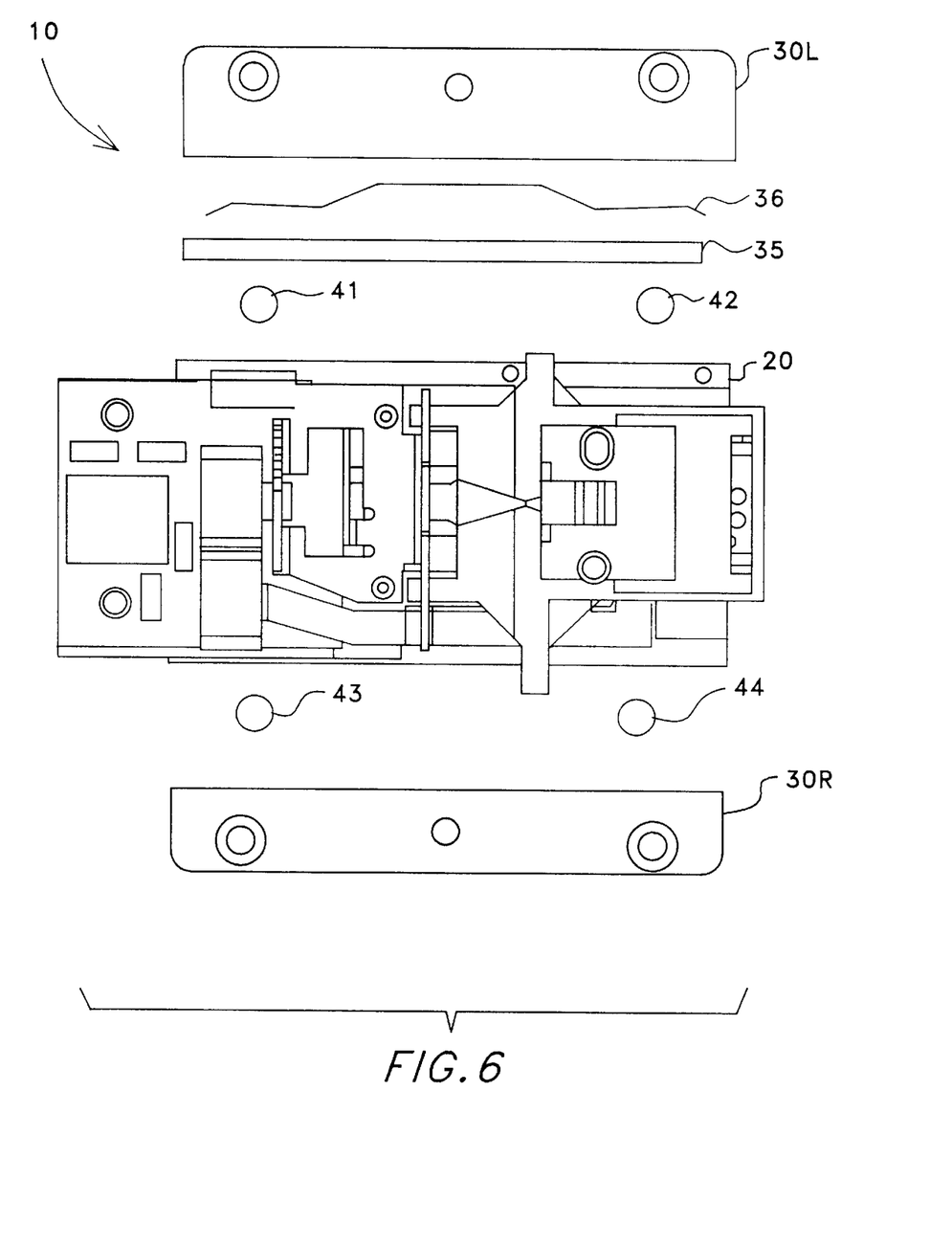
FIG. 6 is a top plan exploded view of the disk drive carriage assembly as illustrated in FIG. 1 constructed in accordance with the present invention.

The carriage 20 is coupled to an actuator motor with the coil 48 being illustrated, for example, in FIG. 4. In response to electronic signals, the actuator motor imparts a motive force to the carriage 20. The carriage 20 is thereby moved with respect to the guiding structure 30 to position the read/write heads relative to the disk(s). The mechanism of the relative movement between the carriage 20 and the guiding structure 30 is described in more detail below.

The carriage assembly 10 of the present invention illustrated in FIG. 1 is for a linear actuator assembly, wherein the carriage 20 moves back and forth with respect to the guiding structure 30 in a generally linear direction. The slots 21–24 and 31–34, the rail 35, the preload spring 36, and the ball bearings 41–44 support the carriage 20 relative to the guiding structure 30 for movement back and forth in a generally linear direction relative to the guiding structure 30.

When the carriage 20 of the carriage assembly 10 of the present invention is in a rearward position, the read/write heads are in an outermost position with respect to the center of the disk(s). In such a position, the ball bearings 41–44 are positioned generally toward the front of the slots 21–24 and generally toward the back of the slots 31–34. When the actuator motor imparts a motive force to the carriage 20 to move the carriage 20 relative to the guiding structure 30 and the read/write heads forward toward the center of the disk, the ball bearings 41–44 roll in the slots 21–24 and 31–34, rolling forward with respect to the slots 31–34 which are fixed relative to the housing and backward with respect to the slots 21–24 which move with the carriage 20. When the carriage 20 reaches a forward position in which the read/write heads are in an innermost position with respect to the center of the disk(s), the ball bearings 41–44 are positioned toward the back of the slots 21–24 and toward the front of the slots 31–34.

When the actuator motor imparts a motive force to the carriage 20 to move it and the read/write heads backwards, away from the center of the disk(s), the ball bearings 41–44 roll in the opposite direction in the slots 21–24 and 31–34. That is, the ball bearings 41–44 roll backward with respect to the slots 31–34 which are fixed relative to the housing and forward with respect to the slots 21–24 which move with the carriage 20. By this arrangement according to the present invention, the carriage is supported for accurate and stable positioning by the use of only a few components.

It will be appreciated by persons skilled in the art that a carriage assembly 10 constructed in accordance with the invention can be produced at a lower cost than known carriage assemblies in which the carriage has a number of radial bearing assemblies, each having a series of spherical ball bearings within inner and outer races. By dispensing with the need for these radial bearing assemblies, and utilizing only four individual spherical balls or ball bearings, the carriage assembly 10 as illustrated in FIG. 1 has significant cost advantages over known carriage assemblies of that type.

The portion of the carriage in which the slots 21–24 are formed and the left and right guiding structure portions 30L and 30R are formed of any suitable material providing a proper rolling surface for the ball bearings, for example a filled polycarbonate material such as DELVIN or NYLON. Suitable materials similarly can be utilized for other components. The rail 35 can be constructed from steel, for example, or the like and the preload spring 36 can be spring steel or spring copper, for example, or any other suitable material.

Figure 11:
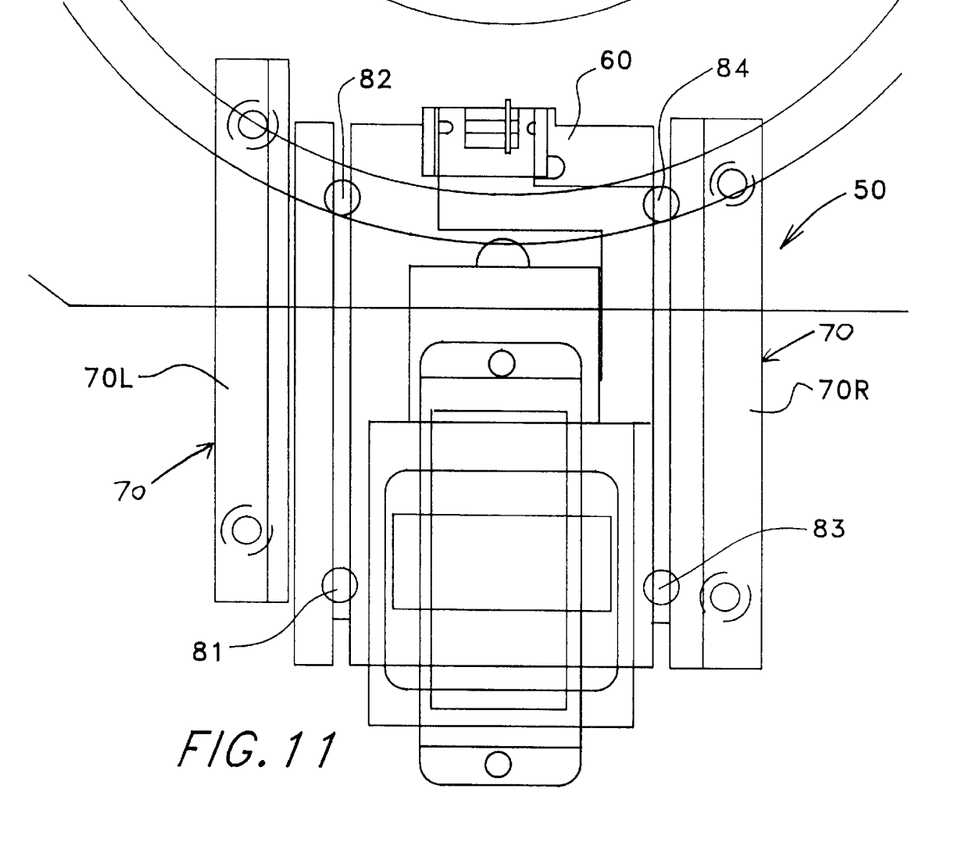
FIG. 11 is a top plan view of another embodiment of a disk drive carriage assembly constructed in accordance with the present invention.
Figure 12:
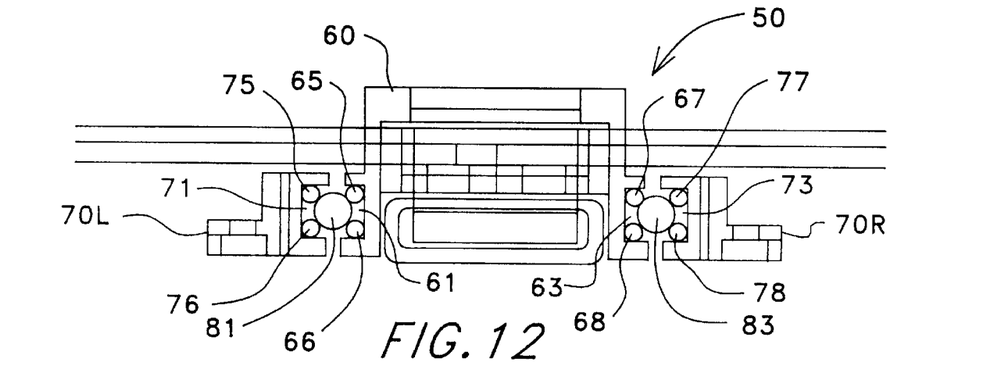
FIG. 12 is a rear elevational view of the disk drive carriage assembly as illustrated in FIG. 11 constructed in accordance with the present invention.

FIGS. 11 and 12 illustrate another embodiment of a carriage assembly 50 having a movable carriage 60 and a guiding structure 70. The guiding structure 70 has a left guiding structure portion 70L and a right guiding structure portion 70R. Both the left guiding structure portion 70L and the right guiding structure portion 70R are fixed to a disk drive housing (not shown).

The movable carriage 60 has a bearing retention structure in the form of integrally formed slots 61 and 63 with rails 65, 66, 67 and 68. The guiding structure 70 has a bearing retention structure in the form of integrally formed slots 71 and 73 with rails 75, 76, 77, and 78.

Positioned within each pair of opposing slots 61 and 71, and 63 and 73, are two individual spherical balls or ball bearings 81, 82, 83, and 84. That is, the ball bearings 81 and 82 are positioned within the slots 61 and 71, and the ball bearings 83 and 84 are positioned within the slots 63 and 73.

The carriage 60 is coupled to an actuator motor, the coil 88 of which is shown. Similarly to the previously described embodiment, the slots 61, 63, 71, 73, rails 65–68 and 75–78, and the ball bearings 81–84 allow the carriage 60 to be supported relative to the guiding structure 70 and to move back and forth in a generally linear direction relative to the guiding structure 70. When the actuator motor moves the carriage 20 back and forth, the ball bearings 81–84 roll along the rails 65–68 and 75–78 in the slots 61, 63, 71 and 73. When the carriage 60 is moved forward, the ball bearings 81–84 roll forward with respect to the slots 71 and 73 which are fixed relative to the housing and backward with respect to the slots 61 and 63 which move with the carriage 60. When the carriage is moved backward, the ball bearings 81–84 then roll backward with respect to the slots 71 and 73 which are fixed relative to the housing and forward with respect to the slots 61 and 63 which move with the carriage 60.

It will be appreciated that in the embodiment illustrated in FIG. 1, the ball bearings 41–44 contact the surfaces of the respective slots 21–24 and 31–34 and the ball bearings 41 and 42 also contact and roll along the rail 35. In the embodiment illustrated in FIG. 11, the ball bearings 81–84 do not directly contact the slots but instead contact only the respective rails. The bearings 81 and 82 roll along the rails 65, 66, 75 and 76, and the bearings 83 and 84 roll along the rails 67, 68, 77 and 78.

In sum, the carriage assembly 10, 60 of the present invention provides a movable carriage and guiding structure, each having a bearing retention structure, for example one or more slots and/or rails, and a series of individual ball bearings located between the bearing retention structure of the movable carriage and the bearing retention structure of the guiding structure. When the actuator motor imparts a motive force to the movable carriage, the movable carriage moves relative to the guiding structure with the individual ball bearings rolling in the slots and/or along the rails. The arrangement provides a cost effective carriage assembly with stable and accurate positioning.

It is within the scope of the present invention to have a rotary actuator (not shown). In a rotary actuator, the guiding structure can comprise a pivot shaft, and the movable carriage can comprise a rotary positioning arm. The pivot shaft and rotary positioning arm can then each have one or more curved slots and/or curved rails, with opposing slots and/or rails having one or more individual spherical balls or ball bearings positioned between them.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. A carriage assembly for a computer disk drive comprising:
   (a) a movable carriage for supporting read/write heads for movement relative to one or more magnetic disks, the movable carriage having one or more slots;
   (b) a guiding structure having a first guiding structure portion and a second guiding structure portion, the movable carriage being supported between the first guiding structure portion and the second guiding structure portion for guiding the movement of the movable carriage, the first and second guiding structure portions having one or more slots;
   (c) a plurality of spherical balls, each spherical ball located between a slot of the movable carriage and a slot of the guiding structure; and
   (d) biasing means positioned between the first guiding structure portion and the movable carriage assembly for biasing the movable carriage assembly in a direction away from the first guiding structure portion.

2. A carriage assembly according to claim 1 further comprising at least one rail within at least one of the slots of the movable carriage.

3. A carriage assembly according to claim 1 further comprising at least one rail within at least one of the slots of the guiding structure.

4. A carriage assembly according to claim 3 wherein said at least one rail is biased by the biasing means.

5. A carriage assembly according to claim 1 wherein the biasing means is a preload spring.

6. A carriage assembly for a computer disk drive comprising:
   (a) a movable carriage for supporting read/write heads for movement relative to one or more magnetic disks;
   (b) a guiding structure having a first guiding structure portion and a second guiding structure portion, the movable carriage being supported between the first guiding structure portion and the second guiding structure portion for guiding the movement of the movable carriage;
   (c) a plurality of spherical balls; and
   (d) biasing means positioned between the first guiding structure portion and the movable carriage assembly for biasing the movable carriage assembly in a direction away from the first guiding structure portion;
   wherein the guiding structure and the movable carriage each have a bearing retention structure, and each spherical ball and biasing means is located between the bearing retention structure of the guiding structure and the bearing retention structure of the movable carriage assembly.

7. A carriage assembly according to claim 6 wherein the bearing retention structure of the movable carriage comprises one or more slots.

8. A carriage assembly according to claim 7 further comprising at least one rail within at least one of the slots of the bearing retention structure of the movable carriage.

9. A carriage assembly according to claim 6 wherein the bearing retention structure of the movable carriage comprises one or more rails.

10. A carriage assembly according to claim 6 wherein the bearing retention structure of the guiding structure comprises one or more slots.

11. A carriage assembly according to claim 10 further comprising at least one rail within at least one of the slots of the bearing retention structure of the guiding structure.

12. A carriage assembly according to claim 11 wherein said at least one rail is biased by the biasing means.

13. A carriage assembly according to claim 12 wherein the biasing means is a preload spring.

14. A carriage assembly according to claim 6 wherein the bearing retention structure of the guiding structure comprises one or more rails.

* * * * *